Nov. 10, 1959 W. A. FISCHER ET AL 2,912,477
THERMOCOUPLES
Filed Sept. 18, 1957
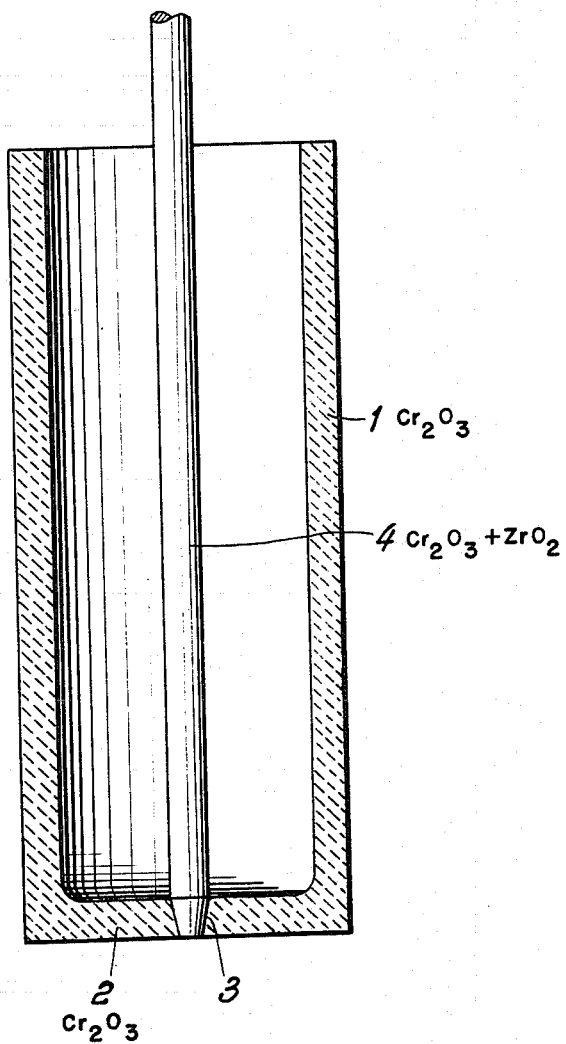
Inventors
WILHELM ANTON FISCHER,
GERT LORENZ
by Mestern + Frey
Armand E. Mestern

United States Patent Office 2,912,477
Patented Nov. 10, 1959

2,912,477
THERMOCOUPLES

Wilhelm Anton Fischer, Ratingen, near Dusseldorf, and Gert Lorenz, Dusseldorf, Germany, assignors to Max-Planck-Institut für Eisenforschung, Dusseldorf, Germany Application September 18, 1957, Serial No. 684,746

4 Claims. (Cl. 136—4)

This invention relates to a thermocouple for measuring high temperatures. In addition to thermocouples in which the elements consist of pure metals or alloys, for example iron-constantan, platinum-platinum/rhodium, nickel-nickel/chromium, thermocouples are also known in which one element consists of a non-metal, for example silicon carbide or tellurium sulphide and the other element consists of a metal, for example bismuth. Finally, thermocouples are also known in which the elements are composed of two different non-metals, for example the Fitterer thermocouple the elements of which consist of silicon carbide and graphite respectively.

Now the present invention relates to a thermocouple for measuring high temperatures having two elements of different compositions and, in accordance with the invention, one element consists of chromic oxide and the other element consists of a mixture of chromic oxide and at least one oxide in which the metal is in a higher or lower valency state than the chromium, for example ferrous oxide, titanium oxide, zirconium oxide. Such elements develop a surprisingly high thermal electromotive force. A thermocouple of which one element consists of chromic oxide and the other element consists of a mixture of chromic oxide with two mol percent $TiO_2$ or $ZrO_2$ has at 1200° C. a thermal E.M.F. of 420 mv., at 1500° C. an E.M.F. of 315 mv., and at 1900° C. an E.M.F. of 275 mv. Therefore, as compared with metal elements the thermal E.M.F. decreases with increasing temperature, but only at temperatures above 1200° C., whereas at temperatures below 1200° C. the E.M.F. increases with rising temperature.

Similar results are obtained when, in accordance also with the invention, both elements of the thermocouples consist of mixtures of metal oxides. For example, one element may consist of chromic oxide and a small proportion of an oxide of a metal in a lower valency state, for example ferrous oxide, and the other arm of a mixture of chromic oxide and an oxide of a metal in a higher valency state, for example zirconium oxide or titanium oxide. Instead of the oxides, the corresponding divalent or tetravalent sulphides can be added to the chromic oxide.

The use of the substances proposed by the invention for making the thermocouple enables a thermocouple to be constructed in an extremely simple manner.

A thermocouple constructed in accordance with the invention is illustrated, by way of example, in the accompanying drawing, which shows a section through the thermocouple.

Referring to the drawing, the bottom 2 of a tube 1 which is made of chromic oxide and forms one element of the thermo element has a conical hole 3 in which the second element 4 of the thermocouple is sintered. The element 4 is in the form of a rod which consists of a mixture of chromic oxide and zirconium oxide. The element 4 projects beyond the open end of the chromic oxide tube 1. The thermal E.M.F. is taken between the rod 4 and the tube 1, care being taken that the temperature is the same at both connections.

The thermocouples constructed in accordance with the invention have, in addition to their high thermal E.M.F. as compared with thermocouples having metal elements, the great advantage that they can be immersed for example in an iron or steel melt without ceramic protecting tubes and are not destroyed by the liquid slags covering the melts. The thermocouples of the invention therefore enable continuous temperature measurements to be made, for example in a converter during blowing.

We claim:

1. A thermocouple for measuring high temperatures having two elements of different compositions in which one element consists of chromic oxide and the other element consists of a mixture of chromic oxide with at least one oxide selected from the class consisting of ferrous oxide, zirconium oxide and titanium oxide.

2. The thermocouple according to claim 1, wherein one element consists of a tube and the other element of a rod which is surrounded by said tube.

3. A thermocouple for measuring high temperatures having two elements of different compositions in which one element consists of a mixture of chromic oxide with a compound selected from the group consisting of ferrous oxide, divalent zirconium oxide, divalent titanium oxide, divalent zirconium sulphide and divalent titanium sulphide, and in which the other element consists of a mixture of chromic oxide with a compound selected from the group consisting of titanium dioxide, zirconium dioxide, titanium disulphide and zirconium disulphide.

4. The thermocouple according to claim 3, wherein one element consists of a tube and the other of a rod which is surrounded by said tube.

References Cited in the file of this patent

UNITED STATES PATENTS

| | | |
|---|---|---|
| 2,232,960 | Milnes | Feb. 25, 1941 |
| 2,571,700 | Ford | Oct. 16, 1951 |